Oct. 22, 1935.  E. S. PLEASONTON  2,017,989
AUTOMATIC CLUTCH MECHANISM
Filed March 15, 1934  2 Sheets-Sheet 1
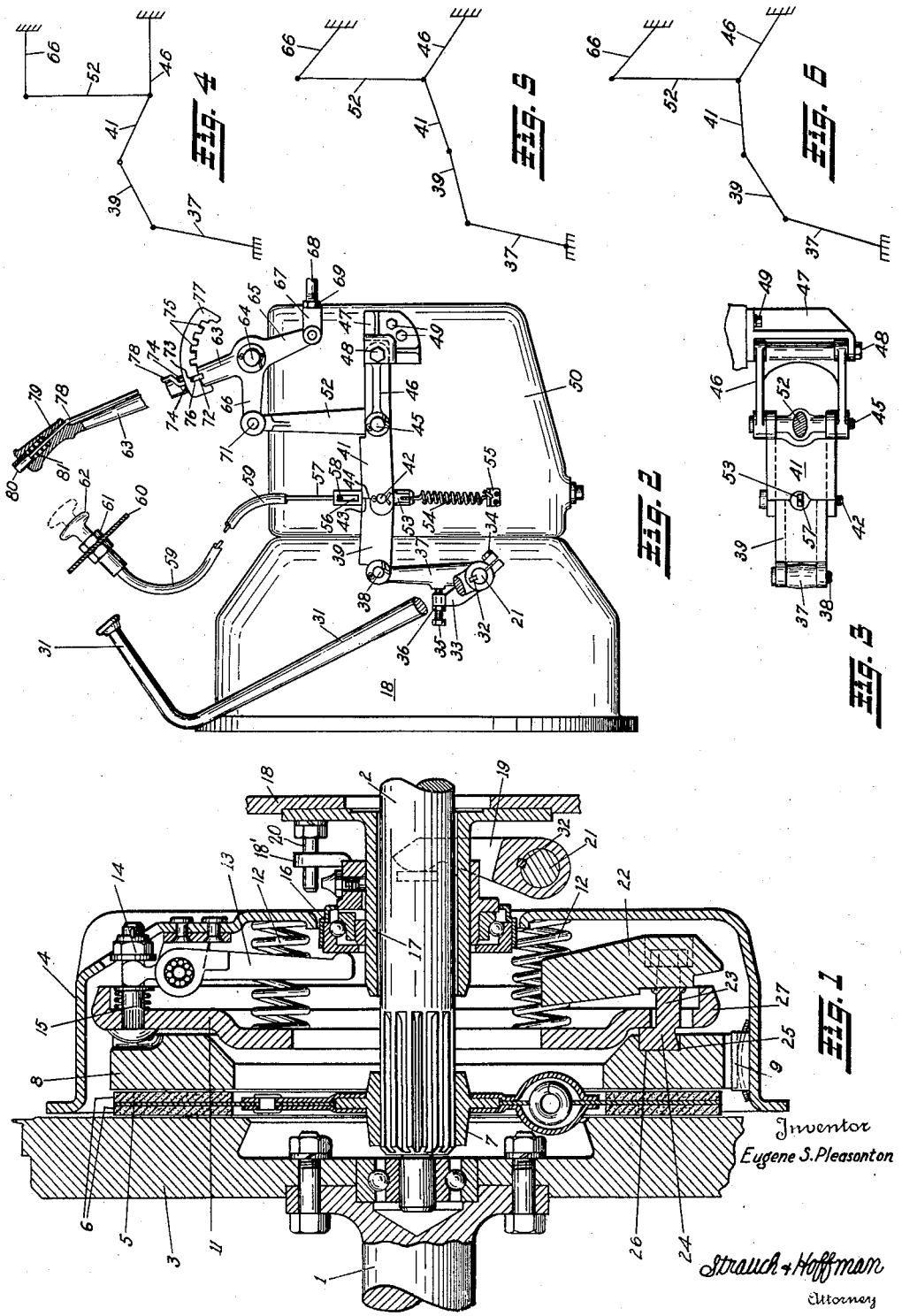
Inventor
Eugene S. Pleasonton
Strauch & Hoffman
Attorney

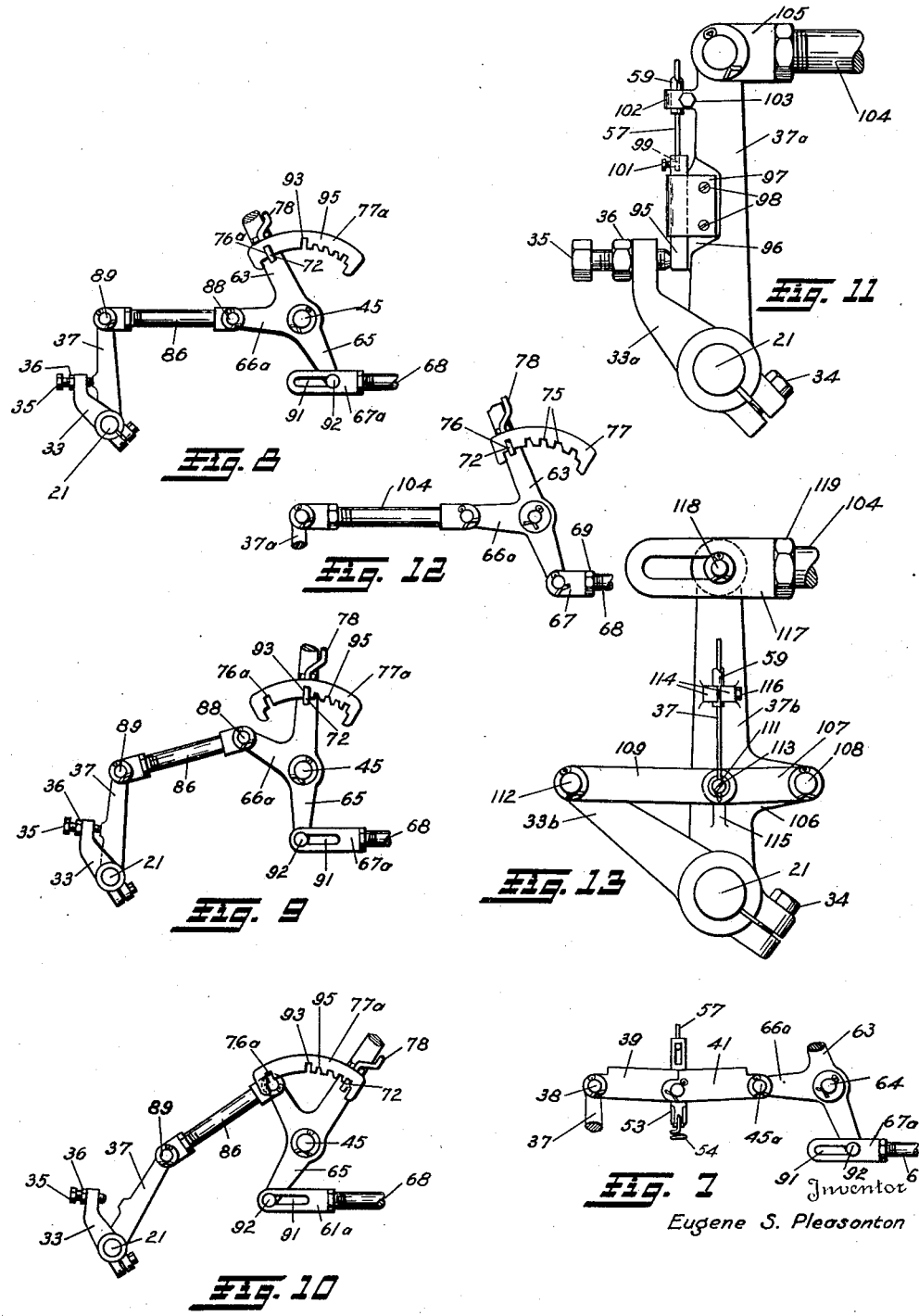

Patented Oct. 22, 1935

2,017,989

UNITED STATES PATENT OFFICE 2,017,989

AUTOMATIC CLUTCH MECHANISM

Eugene S. Pleasonton, Ossining, N. Y., assignor to Automatic Drive & Transmission Company, Gloucester City, N. J., a corporation of New Jersey Application March 15, 1934, Serial No. 715,733

29 Claims. (Cl. 192—13)

The present invention relates to mechanisms for transmitting power from a driving member to a driven member.

More particularly the present invention relates to automatic or self-operating power transmitting mechanisms and it is particularly concerned with devices for modifying or controlling their automatic operating functions.

In clutches of the automatic, or speed responsive type, the plates are disengaged when the speed responsive part thereof (usually the driving shaft or member) is rotating at speeds which are less than their predetermined speed responsive engaging speed. As the clutch plates are disengaged when the engine or other prime mover is stopped, the engine is accordingly disconnected from the load handled by it, and in the case of an automotive vehicle, placing the transmission or other torque multiplying mechanism in gear does not remedy the situation because such transmission is disconnected from the engine by reason of the disengaged clutch.

It is highly desirable that such automatic clutches be operable to effect a driving connection between the prime mover and the load when the prime mover is at rest. For instance, in an automotive vehicle it is desirable, when the battery is weak or the engine is cold, to place the transmission in gear and coast or tow the vehicle so as to turn the engine over for cranking purposes. Another instance where it is desirable to engage the clutch when the engine is dead is where a vehicle is stalled on a grade crossing or other dangerous location, and it is desired to place the transmission in low or reverse gear and propel the vehicle to safety with the engine starting motor. Also when the vehicle is parked on a steep grade, it is desirable to place the transmission in low or reverse gear so as to augment the braking action of the vehicle brake mechanism.

In Patent No. 1,822,716 granted September 8, 1931, to Henry H. Vail, an automatic clutch is disclosed wherein the plates are normally urged toward engaged condition by spring means, and a latch mechanism is employed for releasably holding them in automatic condition, against the action of the spring means, i. e., in such condition that they are disengaged when the driving shaft is rotating at speeds which are less than the automatic engaging speed of the clutch. The latch mechanism may be actuated so as to release the plates and allow the spring means to bring them into engagement when the driving shaft is operating at speeds which are below the automatic engaging speed of the clutch, with the result that if the clutch is installed in an automotive vehicle, the transmission may be placed in gear and the various above described functions performed.

In copending application Serial No. 595,184, filed February 25, 1932, an automatic clutch is disclosed which is so designed that when the speed of the driving shaft falls below a predetermined value, or the prime mover stops, the plates are automatically brought into engagement, thereby making it possible in an automotive vehicle to effect a drive between the prime mover and the vehicle wheels by placing the transmission in gear under such conditions.

The present invention is concerned with devising mechanism for controlling automatic clutches, which possess most of the desirable features of those which have just been described, and further highly important operating characteristics to be hereinafter pointed out.

It is a major object of my invention to devise novel mechanisms for controlling clutches of the automatic or self-operating type, which are simple in design, rugged and durable, and which may be cheaply produced.

A further important object of my invention resides in the provision of speed-responsive clutches with means for moving their parts into and holding them in such relationship that operation thereof is speed-responsive, and which is so constructed that the clutch may be engaged while the holding means is disposed in automatic position.

Another important object is to devise, for use in power delivering organizations of the character wherein a prime mover is adapted to be coupled to a load by means of an automatic clutch, means for causing engagement of the clutch and for causing a braking influence to be exerted upon the load handled thereby.

It is another object of the present invention to provide power drives of the character wherein a speed-responsive clutch is adapted to transmit power from a prime mover to a load having braking means associated therewith with means for normally rendering clutch operation speed responsive when the braking means is released from the load.

Another object of my invention aims to provide power transmitting organizations of the type wherein a clutch, which is responsive to the speed of an associated prime mover, is adapted to transmit power to a load having brake means associated therewith, with means for engaging the clutch, irrespective of the speed of the prime mover, whenever the brake means is actuated.

My invention further aims to devise, for use in power transmitting mechanisms of the character wherein a load, having braking means associated therewith, is connected to a speed-responsive clutch, a mechanism for normally rendering clutch operation speed responsive when the braking means is released, but which may be actuated to render clutch engagement other than speed responsive under such conditions.

It is another object of my invention to devise, for use in clutch mechanisms having a movable member which is engaged in one direction by engaging means, a movable element having force transmitting means associated therewith for causing it to move the clutch member against the action of the engaging means when it is moved in one direction, and which may be actuated so as to render such movements of the element ineffective to cause the clutch member to undergo engaging-means-opposing movements.

A further object of the present invention resides in the provision of a clutch of the character having a movable member which is urged in one direction by spring means, with an element having means for connecting it to the clutch member in such manner that it may be moved to produce movement of the clutch member against the action of the spring means, and which may be selectively rendered incapable of producing such movement of the clutch member.

My invention further aims to provide a clutch of the character having parts which are urged toward engaged condition by engaging means, with an element, having force transmitting means connecting it with the clutch parts, for maintaining the clutch parts in a predetermined position against the action of the engaging means, the force transmitting means being operable to allow the engaging means to bring the clutch parts into engagement irrespective of the position assumed by the element.

Another object is to devise, for use in a speed responsive clutch having parts which are movable from an engaged position to an automatic position against the action of engaging means, a member having force transmitting means for causing it to bring the clutch parts into automatic position against the action of the engaging means when it is moved, the force transmitting means being operable to render movements of the member incapable of producing movement of the clutch parts.

It is a further object of this invention to devise a mechanism adapted to transmit forces between two relatively movable members for limiting movement thereof toward each other, which is so designed that two different parts thereof may be independently actuated to allow the members to move toward each other.

My invention also aims to provide two members, which are mounted for relative movement toward and away from each other, with a mechanism for limiting their movement toward each other which is so designed that two different parts thereof may be independently actuated to allow the members to move toward each other, and at least one of the parts may be operated to force said members away from each other.

Further objects of my invention will become apparent as the detailed description thereof proceeds in connection with the annexed drawings, and from the appended claims.

In the drawings:

Figure 1 is a longitudinal sectional view of one form of automatic clutch mechanism with which my invention may be employed.

Figure 2 is an elevational view of the clutch shown in Figure 1 as it appears when provided with one form of my controlling mechanism.

Figure 3 is a top plan view of the controlling mechanism illustrated in Figure 2.

Figure 4 is a diagrammatical view illustrating the salient parts of the control mechanism shown in Figure 2 in the positions they assume when the hand brake lever is disposed in release position and the latch mechanism is disposed in unlatched condition.

Figure 5 is a view similar to Figure 4 but illustrates the parts as they appear when the hand brake lever is disposed in braking position and the latch mechanism is disposed in latched condition.

Figure 6 is a view similar to Figures 4 and 5 but illustrates the parts as they appear when the hand brake lever is disposed in braking position and the latch mechanism is disposed in unlatched condition.

Figure 7 is a fragmental elevational view of a further controlling mechanism also forming part of the present invention.

Figure 8 is an elevational view of a further modified form of control mechanism forming part of the present invention and illustrates the hand brake lever disposed in fully released position.

Figure 9 is a view similar to Figure 8, but it illustrates the parts in the position they assume when the hand brake lever is disposed in an intermediate position.

Figure 10 is a view similar to Figure 9, but it illustrates the parts disposed in the positions they assume when the hand brake lever is disposed in braking position.

Figure 11 is an enlarged elevational view, with parts in section, of a further modification of my invention, which utilizes some of the parts shown in Figure 1.

Figure 12 is an elevational view illustrating the manner in which the parts of the controlling mechanism shown in Figure 11 are connected to the brake lever, and Figure 13 is a view similar to Figure 11 and illustrates a further modified form of my invention.

With continued reference to the drawings, wherein like reference characters are employed to designate like parts throughout the several views thereof, I have illustrated the automatic clutch mechanism shown in copending application, Serial Number 676,567, filed June 19, 1933, which may be referred to for a more detailed disclosure thereof.

Briefly, the automatic clutch is constructed and operates as follows: Driving and driven shafts 1 and 2 respectively are mounted for rotation in any suitable manner and the driving shaft carries a flywheel 3 which has a cover 4 secured thereto by any suitable means (not shown). A driven disk 5, having facings 6 secured thereto, is carried by a hub 7 splined to shaft 2 and cooperates with a face of flywheel 3 and with an automatic plate 8, which is mounted for synchronous rotation with the driving shaft 1 and flywheel 3 by means of driving lugs 9 which are secured to cover 4 and seat in recesses in the automatic plate. A reaction plate 11 is mounted for rotation with, and is urged toward the automatic plate by means of hold-back spring assemblies, (not shown) and the automatic and reaction plate assembly is urged toward the flywheel by means of compression springs 12 which are interposed between cover 4 and plate 11. The holdback spring assemblies may assume any desired form, as for instance spring assemblies employed in the device illustrated in copending application S. N. 488,757, for urging the automatic plate toward the flywheel, may be successfully employed.

Movement of the automatic and reaction plate assembly under the influence of springs 12 is adapted to be controlled by means of levers 13 journalled on cover 4 and which act against nut and washer assemblies 14 carried by bolts 15 secured to plate 11. The inner ends of levers 13 cooperate with a throwout assembly 16 which is mounted for axial movement on a supporting sleeve 17 secured to a housing 18. Throwout assembly 16 is restrained against rocking movement about sleeve 17 by means of an apertured ear 18' carried thereby which slidably cooperates with a stud 20 secured to housing 18. The assembly is actuated by means of a throwout fork 19 secured to a throwout shaft 21. In Figure 1, the throwout assembly is disposed in its intermediate or automatic position, and it is maintained in this position against the action of springs 12, during certain phases of operation of the clutch by mechanism to be presently described.

Automatic plate 8 and reaction plate 11 are adapted to be forced away from each other in response to acceleration of the driving shaft, by means of a plurality of weights designated generally at 22. Weights 22 are carried by levers 23 which have laterally extending portions 24 disposed and clamped between plates 8 and 11 by means of the hold-back assemblies. Lateral portions 24 are provided on their outer sides with knife edges 25 which are adapted to fulcrum in the outer corners of recesses 26 formed in the automatic plate when the levers swing outwardly in response to centrifugal force.

With driving shaft 1 operating at idling or disengaging speed, and with the throwout mechanism disposed in the position shown in Figure 1, the plates are disengaged and shafts 1 and 2 are accordingly uncoupled. As shaft 1 is accelerated above idling speed, weights 22 rock outwardly about edges 25 as axes and force plates 8 and 11 away from each other and cause pressure to be built up in springs 12 and between the plates. This action forces reaction plate 11 to the right and thereby relieves levers 13 of the stress of springs 12. Torque of gradually increasing magnitude is thereby automatically transmitted from shaft 1 to shaft 2, and when shaft 1 attains a predetermined speed the plates are brought into non-slipping engagement by the action of the weights, and at a speed slightly in excess of this speed the weights move out into engagement with a flange 27 provided on plate 11 and they are thereby prevented from moving further outwardly and building up further pressure between the plates in response to further acceleration of the driving shaft. When the driving shaft is decelerated to idling speed the automatic and reaction plates are brought towards each other by the hold-back assemblies and the clutch is thereby disengaged.

When the clutch is automatically engaged in the manner just described, the plates may be disengaged by moving the throwout mechanism to the left, which through levers 13 and bolts 15 moves reaction plate 11 and automatic plate 8 to the right, and thereby disengages the latter from the driven member.

When the parts are disposed in the positions shown in Figure 1, with the driving shaft operating at or below idling speed, the plates may be brought into driving engagement by allowing the throwout assembly to move to the right under the influence of springs 12. Movement of the throwout assembly to the right allows springs 12 to force plates 8 and 11 to the left and bring plate 8 into driving engagement with the driven member.

With particular reference to Figure 2, shaft 21 extends outwardly of housing 18, and a clutch pedal 31 is mounted thereon and is secured thereto by means of a key 32 or the like. Also mounted on shaft 21 is a bifurcated lever element 33 which is gripped or clamped to shaft 21 by means of a cap screw 34. A screw 35 is threaded into lever 33 and is adapted to be locked in adjusted position therein by means of a locknut 36. Screw 35 is adapted to cooperate with a lever 37 which is mounted for rocking movement on shaft 21, and constitutes abutment means for lever 33 as will hereinafter appear.

Pivotally connected to the upper end of lever 37, by means of a pin 38, is a link member 39 which is preferably constructed of sheet metal and is U-shaped in cross section. A similar link member 41 is pivoted to link 39 by means of a pin 42. Link members 39 and 41 assume the shape of channel members with the open side of each channel facing downwardly as indicated in Figure 3. Links 39 and 41 constitute a toggle assembly and are adapted to be locked when they are swung downwardly slightly past their center as shown in Figure 2 of the drawings, and in order to definitely stop them in this position they are provided with stop faces 43 and 44 respectively.

Pivotally connected to link 41, by means of a pin 45 or the like, is a yoke shaped link member 46, which is supported for swinging movement on a bracket 47, by means of a bolt member 48. Bracket 47 is secured to any suitable part of the driving mechanism or vehicle by means of capscrews 49, and in the present instance the transmission case 50, which is associated with the clutch is utilized as a support therefor. A link member 52 is journaled on pin 45 and it is employed to swing yoke member 46 upwardly in a manner that will be described hereinafter.

With the parts disposed in the positions shown in Figure 2, with pin 45 disposed substantially on a center line between pin 38 and bolt 48, and with pin 42 disposed slightly below pins 38 and 45, lever 37 is disposed, and is maintained in what is termed "automatic position". With the parts disposed in this position, and with the prime mover associated with the clutch operating substantially at, or below idling speeds, lever 37, acting through screw 35, lever 33 and shaft 21, holds the clutch elements in the automatic position shown in Figure 1, with the plates disengaged. With the parts disposed in this position, clutch engagement automatically occurs in response to acceleration of shaft 1 in the manner previously described.

Links 39 and 41 are shown in Figure 2 in what is termed their latching position, and they are adapted to be selectively moved out of this position by mechanism that will now be described. Pivotally mounted on pin 42 is an apertured member 53, and a tension spring 54 is connected to member 53 and is anchored to a bracket 55 which is preferably mounted on the transmission case. Spring 54 urges links 39 and 41 downwardly so as to bring their faces 43 and 44 into engagement, and although I prefer to employ a spring for this purpose, it is to be understood that any other suitable means may be utilized to attain this result, or in fact, gravity may in some instances be relied upon to urge the link members toward latching position.

The upper end of member 53 is provided with a slot 56, and an actuating wire 57 extends through an aperture in member 53 and has an enlarged portion 58 provided thereon which is adapted to work in slot 56, and restrain wire 57 against withdrawal therefrom. Wire 57 extends upwardly within a flexible casing 59 and the two elements are led to a suitable operating location as for instance the dashboard 60 of the vehicle. Casing 59 is secured in position on dash 60 by means of a nut 61, and an operating knob 62 is connected to wire 57 in well known manner.

When knob 62 is pulled out into the dotted line position shown with the yoke 46 disposed in the position shown in Figure 2, links 39 and 41 are lifted upwardly past dead center against the action of spring 54. If pedal 31 is not depressed at this time, springs 12, acting through the throwout assembly, shaft 21, lever 33, screw 35, and lever 37 swing the links into the position shown in Figure 4, and the plates are brought into driving engagement.

When it is desired to restore the parts to automatic position, pedal 31 may be depressed to rock shaft 21 sufficiently to allow spring 54 to restore the links to the position shown in Figure 2. It its to be understood however, that if desired, a two-way connection may be provided between knob 62 and links 39 and 41, so that actuation thereof, or of a similar suitable mechanism, is effective to restore links 39 and 41 to automatic position without resorting to the use of clutch pedal 31, and it is to be understood that mechanisms of this character are intended to be embraced by the appended claims.

Link 52 may be actuated in any suitable manner, but in the present embodiment of my invention I preferably actuate it by means of the hand brake lever 63 to apply the brake mechanism which is utilized in conventional motor vehicles. Lever 63 is mounted on a shaft 64 which may be supported in any suitable manner, and it is provided with arms 65 and 66. Pivotally connected to arm 65 by means of a clevis 67, is a brake rod 68, which is adapted to be locked in adjusted relationship thereto by means of a locknut 69. In view of the fact that rod 68 may be connected to any desired form of two or four-wheel vehicle brake mechanism, whether it be of the mechanical or hydraulic type, and such brake mechanisms are well known in the art, a showing thereof has been omitted for the purpose of simplifying the disclosure of the present case. Arm 66 of lever 63 is provided with a clevis end which is secured to link 52 by means of a pin 71.

A detent 72, having a bevel face 73, is guided for movement between a pair of guide lugs 74, which in the present instance are shown as being integrally formed with lever 63. Detent 72 is adapted to cooperate with teeth 75 and a notch 76 which are formed in a detent plate 77. Plate 77 may be supported in any suitable means, as for instance upon the transmission case.

Detent 72 is provided with an integrally formed rod portion 78 which extends upwardly within a bore 79 formed in the handle portion of lever 63, and is provided on its upper end with an operating piece 80. A compression spring 81 is disposed within bore 79 and acts against piece 80 so as to urge detent 72 into cooperation with the notches formed in plate 77 at all times. The detent assembly just described is so designed as to restrain lever 63 against both clockwise and counterclockwise rocking movement when detent 72 is disposed in notch 76, and it preferably restrains lever 63 only against counterclockwise rocking movement when detent 72 is disposed in engagement with teeth 75. Although I have shown a specific form of detent organization in connection with the present invention, it is to be understood, that if desired, any other suitable means may be employed for selectively restraining lever 63 against movement in the manner just described without departing from the spirit of my invention.

With the parts disposed in the positions which they assume in Figure 2, and with the engine operating substantially at idling speeds, the clutch parts assume the position shown in Figure 1, and the engine may be accelerated to produce speed responsive engagement of the clutch in the manner previously described.

Assuming that the present mechanism is mounted in a motor vehicle or the like, and it is desired to stop it, the vehicle is brought to rest by applying the foot brakes, the engine is shut off, and member 80 is depressed, and lever 63 is rocked to engage detent 72 with teeth 75. Operation of lever 63 in this manner through arm 66 and link 52, swings links 39 and 41, and yoke member 46 into the position shown in Figure 4, and thereby allows springs 12 to bring the plates into driving engagement. Brake lever 63, acting through arm 65 and rod 68 applies the vehicle brakes and if the transmission is disposed in high gear when the vehicle is brought to rest, a direct drive will exist from shaft 1 to the vehicle wheels, and the compression of the engine accordingly is utilized to augment the braking action of the brake mechanism against both forward and reverse coasting tendencies of the vehicle. If it is desired to further augment the action of the brake mechanism, the transmission may be placed in low or reverse gear so as to enable the engine to exert an amplified resistance to rotation of the propeller shaft. If it is desired to apply the hand brake mechanism before the engine is stopped, the transmission may be placed in neutral and lever 63 rocked in a manner previously described so as to actuate the brake mechanism. After the engine has been stopped the transmission may be then placed in any desired gear so as to enable the engine to exert a braking action on the driven parts.

When it is desired to restore the parts to automatic position, for instance, when starting the vehicle, member 80 is depressed so as to bring detent 72 out of engagement with teeth 75, and lever 63 is pushed forwardly, so as to bring the throwout assembly into automatic position. Movement of lever 63 in this manner, through arm 66 and link 52, forces links 39 and 41, and yoke member 46 into the position shown in Figure 2, against the action of springs 12, and during this operation links 39 and 41 behave as a single rigid link in view of the fact that they are held with their faces 43 and 44 abutting by spring 54.

With the parts as shown in Figure 2, and with the engine stopped, and it is desired to effect a driving connection between shafts 1 and 2 for the purpose of towing or coasting the vehicle with the transmission gear so as to turn the engine over, knob 62 is withdrawn so as to bring link members 39 and 41 out of latching relationship. This operation allows springs 12 to bring the plates into driving engagement. The vehicle transmission may accordingly be placed in any gear desired and the vehicle towed or coasted for the purpose of turning the engine over, or under these conditions the starting motor may be employed to propel the vehicle out of a dangerous location if desired. When the engine starts in response to such towing or coasting operation, or it is desired to restore the parts to automatic position for some other reason, pedal 31 is depressed sufficiently to allow spring 54 to restore links 39 and 41 to the position shown in Figure 2 as previously described.

If knob 62 should be pulled out while the brake is applied, links 39 and 41 will be disposed out of latching relationship, assuming the positions shown in Figure 6, and when the brake is released, they will assume the acutely disposed position shown in Figure 5, and pedal 31 must be depressed to again bring the link members into latching relationship. If pedal 31 is depressed while the brake is applied, it is only necessary to depress it enough to take the slack out of the linkage in order to allow spring 54 to restore links 39 and 41 to latching position, whereas if it is depressed after the brake has been released, it is of course necessary to bring it into automatic position in order to bring the links into latching relationship.

With the parts disposed in the positions shown in Figure 2, and with the clutch automatically engaged, and it is desired to disengage the clutch for gear shifting purposes or the like, pedal 31 is depressed so as to move the throwout assembly to the left (Figure 1) and thereby, through lever 13, move the reaction plate to the right. In view of the fact that while this operation is being effected, screw 35, carried by lever 33, merely moves out of engagement with its cooperating surface of lever 37, the latch mechanism does not interfere with the declutching operation, and when pedal 31 is released, screw 35 is again brought into contact with lever 37, and the parts are again maintained in automatic position.

When the clutch facings become thin, as the result of particles thereof wearing away during operation, and the idle release clearance becomes excessive, nut 36 may be loosened and screw 35 backed off sufficiently to allow springs 12 to bring the plates into closer relationship when the parts are disposed in automatic position. When the adjustment has been completed, nut 36 may be tightened to again lock the parts in position.

With reference to Figure 7 of the drawings I have illustrated a controlling organization which operates in substantially the same manner as that just described and which differs therefrom in the construction employed.

In this form of the invention, link member 41 is pivoted directly to arm 66a of lever 63, and with lever 63 disposed in the release position illustrated, wire 57 may be actuated to engage the clutch in the manner described in connection with the first form of my invention. When lever 63 is rocked into braking position and links 39 and 41 are disposed in latched condition, the latter and arm 66a behave as a toggle and allow lever 37 to move into engaging position as described in connection with the first form of my invention, but in this instance lost motion is provided between the hand lever and the brake rod, by means of a pin 92 and an elongated slot 91, so as to permit the engaging operation to be completed prior to initiation of the braking operation.

Although I have illustrated controlling organizations that are operable to move the clutch parts from engaged into automatic position when the hand brake is rocked into released position, it is to be understood that by giving them a greater range of operating movement, they may be utilized to bring the parts from engaged to completely disengaged position, and I intend the appended claims to embrace controlling mechanisms when they are used in this manner.

Referring now to Figures 8, 9 and 10, I have illustrated a further modified form of controlling mechanism that differs both structurally and functionally from the forms previously described, the major difference residing in the use of a single controlling element for the parts of the device.

With continued reference to these figures, a link member 86 is pivotally connected to arm 66a of lever 63 by means of a pin 88, and the other end of link 86 is connected to lever 37 by means of a pin 89. In this form of the invention, clevis 67a is slotted at 91 and is connected to arm 65 by means of pin 92, so as to provide lost-motion between lever 63 and brake rod 68 for a purpose that will presently appear.

Lever 63 is adapted to assume three major operative positions and to this end detent plate 71a is made larger and is provided with an intermediate notch 93 which is similar to notch 76a, and a set of inclined teeth 95 which are similar in function to teeth 75 of the previously described forms of my invention.

When lever 63 is disposed with detent 72 located in notch 76a, arm 66a, acting through link 86, holds lever 37 in automatic position as seen in Figure 8. Lever 37 acting through screw 35, lever 33 and shaft 21 holds the clutch elements in automatic position as previously described.

When lever 63 is rocked into intermediate position, so as to bring detent 72 into notch 93, lever 37 is brought into engaged position, and allows spring 12 to bring the plates into driving engagement and this condition is illustrated in Figure 9. The parts may be operated in this manner to bring the plates into engagement at will without applying the brake mechanism, and this operation corresponds somewhat to that effected by withdrawing knob 62 of the first form of my invention. Movement of the parts into this position causes pin 92 to move into the other end of slot 91 in clevis 67a, and accordingly takes up the slack therein.

When lever 63 is rocked so as to bring detent 72 into engagement with teeth 95, arm 65, acting through pin 92 and clevis 67a, actuates the brake mechanism. During this operation link 86 and lever 37 are brought into the positions illustrated in Figure 10 of the drawings, and in view of the one-way connection existing between shaft 21 and lever 37 constituted by level 33 and screw 35, no movement of the throwout mechanism is effected thereby. When lever 63 is rocked in the opposite direction, to bring detent 72 into notch 93, the brake is released, and as the clearance existing between screw 35 and lever 37 is merely taken up, accordingly no movement of shaft 21 occurs during this phase of operation. Rocking lever 63 further, serves to bring detent 72 into notch 76 and causes lever 37 to pick up the screw carried by lever 33 and thereby rocks shaft 21 into automatic position. During this operation pin 92 merely slides in slot 91 and it accordingly does not produce actuation of the brake mechanism. In view of the fact that links 39 and 41 are dispensed with in this form of the invention, control of the clutch is reduced to one lever and the clutch pedal, as the latter may be actuated to disengage the clutch in the manner previously described.

In connection with this particular form of the invention, it is to be understood that although I have shown an organization wherein initial movement of the brake lever towards braking position allows the clutch to go into engagement, and final movement of the lever causes the brake mechanism to be actuated, if desired, these distinct stages may be merged, and movement of the brake lever be utilized to simultaneously cause clutch engagement and produce brake application, and the appended claims are intended to embrace my mechanism when it is employed to have these operating characteristics.

With reference to Figures 11 and 12 of the drawings, a modified form of controlling mechanism is disclosed wherein a different form of latch mechanism is employed.

With particular reference to Figure 11, lever 33a is similarly constructed and is identical in function to that of the levers employed in the previously described forms of my invention with the exception that screw 35 thereof cooperates with a plunger member 95 which is mounted for longitudinal movement on lever 37a. Plunger 95 is disposed in sliding engagement with a raised or boss portion 96 formed on lever 37a, and is guided for movement thereon by means of a U-shaped guide member 97, which is secured to lever 37a by means of screws 98. Plunger 95 is provided with a bore 99 in which actuator wire 57 is disposed. Wire 57 is retained in bore 99 by means of a set screw 101, and housing 59 is disposed between a pair of arms 102 formed on lever 37a and is clamped therebetween by means of a cap screw 103 which is threaded therein. Housing 59 is so located, and is led up the vehicle dash in such a manner, that it does not interfere with the swinging movements of lever 37a.

A link member 104 is pivotally connected to the upper end of lever 37a by means of a clevis 105 and link 104 is pivotally connected to arm 66a of lever 63 by means of a pin or the like. In this form of the invention, detent plate 77a is employed so that lever 63 may only have two major operating positions.

With the parts disposed in the position shown in Figure 11, with detent 72 acting through lever 63, arm 66a and link 104 and holding lever 37a in the position shown, plunger 95, acting through screw 35, lever 33a and shaft 21, holds the clutch parts in the positions shown in Figure 1 of the drawings when the engine or the prime mover is operated substantially at idling speeds or is stationary. With the parts disposed in this condition, the engine may accordingly be accelerated to produce automatic clutch engagement in the manner previously described.

When lever 63 is rocked into braking position, with detent 72 engaging teeth 75, so as to actuate the brake mechanism, arm 66a swings lever 37a into engaging position, with the result that the clutch is automatically engaged when the brake lever is rocked so as to actuate the brake mechanism. The parts may be restored to automatic position by rocking lever 63 so as to bring its detent into notch 76. During the operation just described, levers 33a and 37a move as a unit in view of the driving connection established therebetween by plunger 95.

With the parts disposed in automatic position, and it is desired to engage the clutch without applying the brakes, knob 62 is pulled out so as to cause wire 57 to move plunger 95 upwardly and out of engagement with screw 35. In the event that the friction between plunger 95 and portion 96 of lever 37a is excessive as the result of springs 12 acting thereon through the throwout mechanism, clutch pedal 31 may be slightly depressed prior to this operation, so as to relieve plunger 95 of the spring pressure. When plunger 95 is moved out of the path of movement of screw 35, springs 12, acting through the throwout assembly and shaft 21, swing lever 33a so as to bring screw 35 into close proximity to lever 37a, and the plates are thereby brought into driving engagement. When the clutch is engaged in this manner, and it is desired to restore the parts to automatic position, pedal 31 is depressed sufficiently to bring screw 35 out of the path of movement of plunger 95, and operating knob 62 is pushed in so as to bring plunger 95 between it and boss 96. When pedal 31 is released, plunger 95 will again stop screw 35 and maintain lever 33a and shaft 21 in automatic position.

Adjustment for facing wear is effected by backing off screw 35 as previously described.

In Figure 13 of the drawings, I have shown the device illustrated in Figures 11 and 12 as being provided with a slightly modified form of latch mechanism which enables the parts to be released without relieving the stress on the parts by depressing pedal 31. In this form of the invention, lever 37b is provided with a preferably integrally formed ear 106 to which a link 107 is pivotally connected by means of a pin 108. Link 107 is connected to a similar link 109 by means of pin 111 and link 109 is pivoted to lever 33b by means of a pin 112. Secured in a bore in pin 109, by means of a set screw 113, is wire 57 utilized in the previously described forms of my invention. Housing 59 is clamped between two ears 114 formed on lever 37b by means of a screw 116.

When the parts are disposed in the positions shown in Figure 13, with links 107 and 109 disposed slightly below center, springs 12, acting through the throwout assembly and shaft 21, tend to urge the links downwardly, and in order to limit their downward movement I have provided a lug 115 on lever 37b, with which the links are adapted to contact.

In this form of the invention lever 37b is connected to link 104 by means of a slotted clevis 117, a pin 118 and a locknut 119 so as to provide sufficient lost-motion to allow pedal 31 to be depressed for declutching purposes without interference from links 107 and 109, which establish a two-way connection between lever 37b and link 104. The detent plate 71 is employed with this form of controlling mechanism and lever 63 accordingly has two major operating positions.

With the parts disposed in the positions shown in Figure 13, with detent 72 disposed in notch 76, links 107 and 109, acting through lever 33b, shaft 21 and the throwout assembly hold the clutch parts in the automatic position illustrated in Figure 1, and under these conditions the engine may be accelerated to automatically cause clutch engagement in the manner previously set forth. When it is desired to engage the clutch when the engine is idling, or is stopped, knob 62 is withdrawn so as to pull links 107 and 108 upwardly past center. When this has been effected, springs 12 engage the clutch as previously explained, and lever 33b rocks clockwise and swings the links further upwardly.

With the parts disposed in automatic position, pin 118 is disposed in the right hand end of the slot in clevis 117, with the result that pedal 31 may be depressed to move the clutch parts into disengaged position, as movement of lever 37b during such operation merely causes pin 118 to move into the left-hand end of the slot in clevis 117.

With latch members 107 and 109 disposed as shown in Figure 13, rocking movement of lever 63, so as to bring detent 72 into engagement with teeth 75, applies the vehicle brakes as previously set forth and allows levers 37b and 33a to rock clockwise into engaging position under the influence of springs 12, and movement of lever 63 in the opposite direction, through link 104, and levers 33a and 37b and shaft 21, restores the parts to automatic position, and it is observed that during this operation links 107 and 109 act as a rigid connection between levers 33a and 37b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch mechanism of the character having parts which may be moved into one position so as to render clutch engagement speed responsive, and which may be moved into another position to render clutch engagement non-speed responsive, a driven member; braking means adapted to exert braking influences upon said driven member; and common means for moving said clutch parts into said second named position and actuating said braking means.

2. The mechanism described in claim 1, wherein said last named means is operable to cause said braking means to exert braking influence upon said driven member when it is operated so as to move the clutch parts into said last-named position.

3. In a clutch mechanism, a clutch of the character having means for rendering clutch engagement speed responsive or non-speed responsive at will, a driven member; releasable braking means associated with said driven member; and means for automatically rendering clutch engagement speed responsive when said braking means is released.

4. The mechanism described in claim 3, wherein said last-named means is operably connected to said clutch means and said braking means.

5. The mechanism set forth in claim 3, wherein said last-named means is selectively operable to render clutch engagement other than speed responsive when said brake means is released.

6. In a power transmitting mechanism, a driving member; a clutch which is normally responsive to variations in the speed of said driving member, and which is normally disengaged when said driving member is operating below a predetermined speed; a driven member; braking means adapted to apply decelerating forces to said driven member; and means for causing said clutch to engage whenever said brake means is actuated.

7. The mechanism described in claim 6, wherein said last-named means is operable to cause said clutch to engage whenever said brake means is actuated so as to exert decelerating influences upon said driven member.

8. In a clutch, a movable member; engaging means tending to urge said member in one direction; a movable element; force transmitting means associated with said member and said element for normally causing said element to move said member against the action of said engaging means when it is moved in one direction; said force transmitting means being operable to render said element ineffective to produce movement of said member when it is moved in said direction.

9. The device set forth in claim 8, wherein said force transmitting means is operable to render said element ineffective to produce movement of said member when it is moved in either direction.

10. In a clutch mechanism, driving and driven members mounted for engagement and disengagement; engaging means tending to force said members into engagement; a movable element; force transmitting means operably connected to said element and adapted to move said members apart against the action of said engaging means when the element is moved in one direction; and means for rendering said force transmitting means ineffective to transmit movement producing force from said element to said members.

11. In a clutch of the character wherein the parts are urged toward clutch engaging position by engaging means, a movable controlling member; force transmitting means operably associated with said parts and said member for maintaining said parts disengaged against the action of said engaging means when said member is disposed in one position, said force transmitting means being operable to allow said engaging means to engage said parts when said member is disposed in said position.

12. The device described in claim 11, wherein said member is operable to allow said engaging means to bring said parts into engagement when it is moved into a second position.

13. In a clutch, in sub-combination, two members mounted for relative movement toward and away from each other; means tending to urge said one of members in one direction; a mechanism associated with said members and adapted to restrain them against relative movement in one direction; and at least two independent means for causing said mechanism to allow movement of said members in said direction.

14. The device described in claim 13, wherein said urging means tends to urge said members relatively toward each other, and said mechanism is adapted to restrain them against movement under the influence of said urging means.

15. In a clutch controlling organization, in subcombination, a movable element, a reaction member; a latch mechanism adapted to apply movement restraining forces to said element and impose reactive forces upon said reaction member, said latch mechanism being operable to allow said element to move in one direction; and means associated with said reaction member for permitting said element to move in said direction independently of actuation of said latch mechanism.

16. The device described in claim 15, wherein said element is adapted to move toward and away from said reaction member, and said latch mechanism is adapted to selectively restrain said element against movement toward said reaction member.

17. The device described in claim 15, wherein said latch mechanism comprises at least one link member which is pivotally connected to said element.

18. The device described in claim 15, wherein said latch mechanism comprises at least one compression member which is pivotally connected to said element.

19. The device described in claim 15, wherein said latch mechanism comprises at least two link members which are pivotally connected to each other and to said element and reaction member.

20. A clutch controlling mechanism for use with a clutch having a lever which is operable to control clutch engagement, comprising a link member having a fixed pivot, a pair of links pivotally connected to each other and to said lever and link member, said links and link member being operable to sustain compressional forces and maintain said lever in one clutch controlling position when they are all disposed substantially in a common plane, and means for moving said links out of said common plane for allowing said lever to move into a second clutch controlling position.

21. The mechanism described in claim 20, together with means for moving said link member and one of said links out of said common plane for also allowing said lever to move into a second clutch controlling position.

22. In a controlling mechanism for a brake and an automatic clutch having means for selectively rendering its operation speed-responsive or non-speed-responsive, a control lever, means for connecting said control lever to said clutch whereby movement of said lever from one position into a second position is operable to render clutch operation non-speed-responsive, and means effective when said lever is moved a further distance in said one direction into a third position, for actuating said brake.

23. The mechanism described in claim 22, wherein said last-named means comprises a lost-motion connection between said lever and said brake.

24. The mechanism described in claim 22, together with means for disengaging said clutch independently of said means.

25. In combination with the throwout shaft of a clutch, a lever freely journalled on said shaft, a second lever secured to said shaft, holding means for selectively holding said second lever in a plurality of adjusted positions, and coupling means for selectively establishing a driving connection between said levers, whereby said holding means may be selectively employed to hold said shaft in a plurality of adjusted positions.

26. The device described in claim 25, wherein said coupling means comprises a pair of toggle-forming links which are pivotally connected to said levers.

27. The device described in claim 25, wherein said coupling means comprises a slidable plunger carried by one of said levers and which is adapted to be selectively engaged with a projection provided on the other of said levers.

28. The device described in claim 25, wherein said coupling means is operable to effect minor relative movement of said levers for adjusting purposes when it is in driving connection establishing condition.

29. The device described in claim 25, together with means for rocking said shaft independently of said holding or coupling means.

EUGENE S. PLEASONTON.